Feb. 23, 1960     T. S. DAYTON ET AL     2,926,020
QUICK-CHANGE CHUCK
Filed Jan. 2, 1958
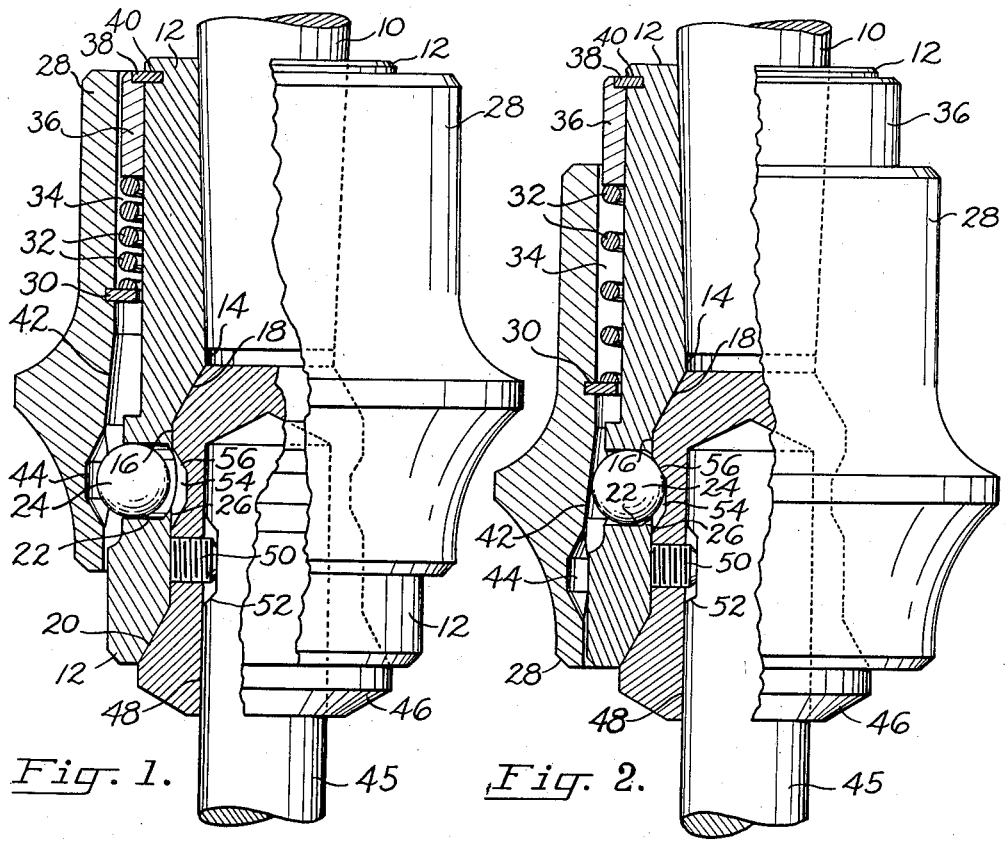
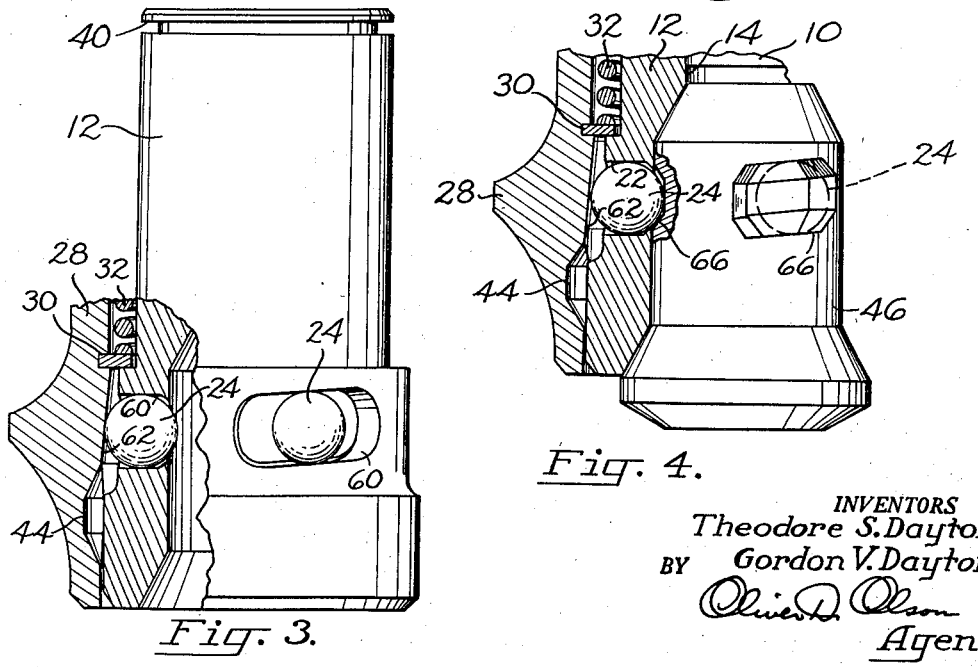
INVENTORS
Theodore S. Dayton
BY   Gordon V. Dayton
Agent United States Patent Office 2,926,020
Patented Feb. 23, 1960

2,926,020

QUICK-CHANGE CHUCK

Theodore S. Dayton and Gordon V. Dayton, Portland, Oreg., assignors, by mesne assignments, to Pacific Tool and Manufacturing Co., Portland, Oreg., a corporation of Oregon Application January 2, 1958, Serial No. 706,754

5 Claims. (Cl. 279—75)

This invention pertains to drill bit chucks, and relates particularly to a drill bit chuck which accommodates rapid attachment and release of drill bits during rotation of the chuck.

Many commercial operations require the drilling of a multiplicity of holes of different diameters, and economy of production dictates that these operations be performed with speed and precision. Such operations have been performed heretofore primarily by one of two methods. One method involves the use of a complex and expensive drill press which is provided with a multiplicity of chucks driven from a single power source and each adapted to support a bit of different size. A second method involves the use of a multiplicity of less expensive drill presses, each of which is provided with a single chuck adapted to support a drill bit.

In order to avoid the excessive costs either of the complex multiple chuck drill presses or the multiplicity of single chuck drill presses, attempts have been made heretofore to provide a chuck which would permit attachment and release of drill bits without the necessity of shutting down the drill press. However, quick change chucks as have been provided heretofore have failed in one important respect to provide satisfactory operation. This failure of satisfactory operation involves the inability of such chucks to hold a drill bit firmly on the axis of rotation, with the result that the bit wobbles and chatters excessively during drilling, thereby producing a hole which either is of improper size or is displaced in position, or both.

Accordingly, it is a principal object of the present invention to provide a quick-change chuck which accommodates positive attachment and release of a bit during rotation of the chuck.

Another important object of this invention is the provision of a quick-change chuck which is capable of holding a bit positively and firmly on the rotational axis of the chuck, thereby eliminating all possibility of wobble and chatter of the bit.

A further important object of the present invention is to provide a quick-change chuck which is adaptable for use with all forms of drill presses and other rotary devices.

Still another important object of this invention is the provision of a quick-change chuck which is of simplified construction for economical manufacture, which is precise and efficient in operation, and which requires a minimum of maintenance and repair.

The foregoing and other objects and advantages of this invention will appear from the following detailed description taken in connection with the accompanying drawing, in which:

Figure 1 is a view in side elevation, partly in section, of a quick-change chuck embodying the features of the present invention, the parts being shown in bit-releasing position;

Figure 2 is a view similar to Figure 1, but with the parts being shown in bit-locking position;

Figure 3 is a fragmentary view in side elevation, partly in section, of a modified form of quick-change chuck embodying the features of this invention; and Figure 4 is a fragmentary view in side elevation, partly in section, of a still further modified form of quick-change chuck embodying the features of this invention.

Referring to Figures 1 and 2 of the drawing, there is shown the rotary drive shaft 10 of a drill press, the same being adapted to releasably mount a drill bit chuck thereon. In the form illustrated, the drive shaft is provided with a friction taper end by which to accommodate frictional attachment of a chuck. Other conventional forms of chuck attachments may be employed, as desired.

The quick-change chuck of the present invention includes a support member 12 which is provided at one end with a tapered bore 14 for receiving the friction taper of the drill press drive shaft 10. It will be understood that this attaching end may be formed in any manner to accommodate attachment to drill press drive shafts or other rotary members of various types and constructions and may, for example, include as an integral part thereof an extending shaft which may be secured in a second chuck.

The forward end of the support member is provided with an axial bore 16 which, in the embodiment illustrated in Figures 1 and 2, is of uniform diameter intermediate its ends. The rearward end of the bore converges rearwardly to reduced diameter to form a tapered seat 18. Similarly, the forward end of the bore diverges forwardly to form a second tapered seat 20.

One or more transverse openings 22 are provided in the support member intermediate the ends of the axial bore 16, it being preferred that three such openings be provided, equally spaced apart at intervals of 120°. Each opening is adapted to contain a locking ball 24 freely therein and is constricted slightly at its inner end, as at 26, to limit inward displacement of the ball, as described hereinafter.

Mounted concentrically about the support member for independent rotation and longitudinal movement is a hollow locking collar 28. Intermediate the ends of the axial bore of the collar is an inwardly projecting annular ring 30 which functions as an abutment for the forward end of a coil spring 32 which is positioned in the space 34 between the outer surface of the support member and the inner surface of the locking collar. The rearward end of the spring abuts against a spacer ring 36 which, in turn, abuts against a lock ring 38 releasably mounted in an annular groove 40 in the rearward end of the support member. Thus, the coil spring functions to urge the locking collar toward the forward end of the support member.

The axial bore of the locking collar diverges forwardly from a point adjacent the intermediate ring 30 to form an annular camming surface 42. This camming surface terminates forwardly in an annular depression 44.

It is conventional practice in the manufacture of drill bits to provide a shank end 45 of substantially uniform diameter for attachment to conventional chucks. Thus, in order to adapt such bits for attachment to the chuck of the present invention, there is provided a bit adapter 46 having an outer profile matching the cross sectional profile of the axial bore 16 including the seats 18, 20. However, the outer diameter of the adapter is slightly less than the corresponding diameter of the axial bore 16, in order to eliminate friction therebetween and to afford ready release of the adapter from the sleeve, as explained more fully hereinafter.

The adapter also is provided with an axial bore 48 of substantially uniform diameter. This bore extends from the forward end of the adapter and terminates adjacent the rearward end thereof, and is proportioned to receive therein the shank end 45 of a drill bit. A transverse threaded opening communicates with said internal bore of the adapter and carries a threaded set screw 50 which is adapted to seat within a depression 52 formed in the drill bit shank, whereby to secure the latter firmly to the adapter.

There is also provided in the outer surface of the adapter one or more sockets 54 each arranged to receive one of the locking balls. Each socket includes a rearward cam surface 56 which extends obliquely from the base of the socket rearwardly to the outer surface of the adapter. This cam surface is so arranged with respect to the ball that the latter rests in contact therewith when in locked position, as explained more fully hereinafter.

The operation of the quick-change chuck described hereinbefore is as follows:

To attach a drill bit to the chuck, the adapter 46 first is secured to the drill bit shank 45 as explained hereinbefore. The operator then grips the locking collar 28 between his fingers and lifts upwardly thereon against the tension of the coil spring 32 until the collar reaches the position shown in Figure 1. The adapter end of the bit then is inserted in the axial bore of the support member 12, whereupon the operator releases the locking collar and the latter is urged forwardly under the influence of the spring.

Assuming that the drill press drive shaft is in rotation during these manipulations, the locking balls 24 are urged radially outward by centrifugal force. But as the locking collar is urged forwardly, the balls are engaged by the cam surface 42 of the locking collar and thus urged radially inward against such centrifugal force, into contact with the surface of the adapter. Since the locking balls rotate with the support member, they become aligned ultimately with the sockets 54 in the adapter and thus enter the same under the influence of the camming surface 42 of the forwardly moving locking collar.

As the locking balls are forced radially inward, in engagement with the cam surfaces 56 on the adapater, the latter is forced rearwardly until the outer oblique surfaces of the adapter abut firmly against the seats 18, 20 formed in the support member 12. This position is shown in Figure 2. Thus, the adapter and its attached drill bit are held firmly and positively on the axis of rotation of the chuck, notwithstanding the fact that there may be considerable space between the intermediate surfaces of the adapter and support member. In this manner the possibility of wobble and chatter of the bit is completely eliminated.

To release the bit from the rotating chuck, the operator simply moves the locking collar 28 rearwardly, to the position shown in Figure 1, whereupon centrifugal force urges the locking balls 24 radially outward into the annular depression 44, and the bit and attached adapter fall freely from the support member.

In Figure 3 of the drawing there is disclosed a modified construction which performs the releasable locking operation of the cam surfaces 42 and 56 of the embodiment described hereinbefore. In the modification of Figure 3, the support member 12 is provided with a cam slot 60 for each locking ball, each slot extending along a helical or spiral path about the periphery of the support member, obliquely rearward in the direction opposite the rotation of the chuck. The inner surface 62 of the locking collar 28 and the annular depression 44 function merely to move the locking balls 24 radially inward into the sockets 54 provided in the adapter 46, but they need not provide the camming force of the locking ball against the cam surface 56 on the adapter shown in Figure 1.

In the operation of the modification of Figure 3, the resistance to rotation of the bit, especially as the latter engages the work to be drilled, causes the locking balls to travel rearwardly along the helical cam slots in the support member, whereupon the adapter 46 is drawn rearwardly into firm abutment with the seats 18, 20.

In the modification of Figure 4, the adapter 46 is provided with a spiral or helical cam groove 66 similar to the slot 60 in Figure 3, arranged for registration with each of the locking balls 24. The locking balls are confined within the openings 22 formed in the support member 12, as in the modifications of Figures 1 and 2. The grooves 66 extend forward in the direction of rotation of the chuck, whereupon resistance to rotation of the bit causes the locking balls to move forwardly along the helical grooves and thus to draw the adapter rearwardly into firm abutment with the seats 18, 20.

From the foregoing, it is believed to be apparent that the present invention provides a quick-change chuck which functions to secure a bit positively and firmly therein, with complete elimination of all wobble and chatter inherent in quick-change chucks of prior construction. Moreover, the chuck of the present invention is of simplified construction and yet positive and precise in operation.

It will be apparent to those skilled in the art that various changes in the structural details described hereinbefore may be made without departing from the scope and spirit of this invention. For example, if size of the chuck and adapter are of little importance, the spaced seats 18, 20 on the support member and the complementary surfaces on the adapter may be replaced by a single continuous taper. Since the included angle of such taper preferably is at least 25°, to prevent frictional interengagement, the construction illustrated is preferred for its effective reduction of the chuck and adapter to minimum diameters.

Although in most instances of use the chuck is arranged to rotate on a vertical axis with the drill bit projecting forward in a downward direction, the chuck may be mounted for rotation on a horizontal axis, to accommodate certain types of apparatus and operations. When the chuck is arranged to rotate on a vertical axis, with the drill bit projecting downwardly, the coil spring 32 may be omitted if desired. The arrangement of spring 32 and depression 44 may be reversed, if desired, to provide release of the bit by forward movement of collar 28. The adapter 46 may be formed as an integral part of the shank of the drill bit, or as an attachment as illustrated. Since these and other modifications may be made, it is understood that the foregoing description is primarily illustrative of the invention and is not to be considered as limiting the scope of the appended claims.

Having now described our invention and the manner in which the same may be used, what we claim as new and desire to secure by Letters Patent is:

1. For use with a tool having a shank end, a quick-change chuck comprising a support member having a hollow forward end section defining annular oblique seat means therein, a plurality of locking ball means mounted at circumferentially spaced intervals on the forward end section of the support member for radial movement between a locking position projecting into the opening in the hollow forward end section and a retracted position removed from said opening, a locking collar mounted on the support member for longitudinal adjustment with respect to the latter, cam means on the locking collar arranged in the locking position of adjustment of the locking collar to engage the locking ball means and force the latter inward to their locking position and in the releasing position of adjustment of the locking collar to retract from engagement with the locking ball means and afford retraction of the latter from the opening in the hollow forward end section of the support member, a tool supporting adapter member proportioned for releasable reception in the hollow forward end of the support member and having external annular oblique seat means thereon matching the internal seat means of the support member, the adapter member having a plurality of depressed sockets in its outer surface arranged at circumferentially spaced intervals for registry with the spaced locking ball means, each socket being proportioned to receive and confine a locking ball therein against relative circumferential displacement, whereby to lock the support member and adapter together against relative axial rotation and the axially rearward wall of each socket extending obliquely outward and rearward to form a cam surface engageable by the locking ball means to force the adapter seat means rearward into firm abutment with the seat means on the support member, the adapter member having a longitudinal opening therein for receiving the shank end of a tool, and securing means on the adapter member for releasably securing the shank end of a tool thereto.

2. The quick-change chuck of claim 1 wherein the matching seat means on the support means and adapter each comprises a pair of axially spaced seats, and the plurality of locking ball means and sockets are positioned between the spaced seats.

3. The quick-change chuck of claim 2 wherein the included angle between the longitudinal axis and each seat means on the adapter member is at least 25°.

4. The quick-change chuck of claim 1 wherein the matching seat means on the support means and adapter each comprises a pair of axially spaced seats, and the plurality of locking ball means and sockets are positioned between the spaced seats, the locking ball means and sockets being three in number and arranged at circumferentially spaced intervals of 120°.

5. The quick-change chuck of claim 1 including resilient means interposed between the support member and locking collar for urging the latter toward locking position.

References Cited in the file of this patent

UNITED STATES PATENTS

| | | |
|---|---|---|
| 1,636,421 | Knott | July 19, 1927 |
| 1,740,645 | Currier | Dec. 24, 1929 |
| 1,781,442 | Currier | Nov. 11, 1930 |

FOREIGN PATENTS

| | | |
|---|---|---|
| 874,855 | Germany | Apr. 27, 1953 |